Patented July 12, 1938

2,123,748

UNITED STATES PATENT OFFICE 2,123,748

METALLIFEROUS NITRO-AZO-DYESTUFFS

Hans Schindhelm, Frankfort-on-the-Main-Fechenheim, Germany, assignor to General Aniline Works, Inc., New York, N. Y., a corporation of Delaware No Drawing. Application November 2, 1935, Serial No. 48,057. In Germany November 6, 1934

1 Claim. (Cl. 260—12)

This invention relates to new metalliferous nitro-azo-dyestuffs, more particularly to copper compounds of dyestuffs corresponding to the general formula:

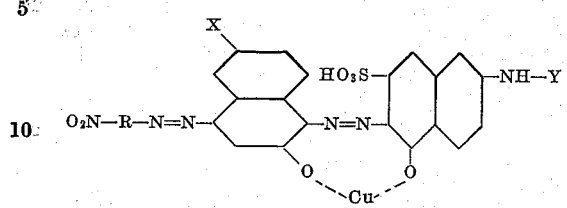

wherein R means the radical of a diazotization component of one of the groups consisting of compounds of the benzene and naphthalene series, X stands for one of the groups consisting of hydrogen and a sulfonic acid group and Y stands for one of the group consisting of an acyl radical and a radical of the benzene series.

These dyestuffs are obtainable by diazotizing a nitro-diazo compound, combining it with a 1-amino-2-naphthol-ether, diazotizing again, combining with an N-derivative of 2-amino-5-hydroxy-naphthalene-7-sulfonic acid and finally treating the dyestuff with agents delivering copper.

As first components may be used for instance: nitranilines, nitrotoluidines, nitro-anisidines, nitro-chloroanilines, nitraniline-sulfonic acid, nitro-naphthylamine-sulfonic-acids, nitrophenyl-azo-amino-naphthalene sulfonic acids.

As middle components may be used: the alkyl ethers of 1-amino-2-hydroxy-naphthalene or their sulfonic acids.

As third component may be used for instance: 2-acetylamino-, 2-benzoylamino-, 2-phenylamino-, 1,2-imidazolyl-5-hydroxy-naphthalene-7-sulfonic acids.

The new metalliferous nitro-azo-dyestuffs dye the fibers, especially vegetable fibers, grey shades of a good fastness. They exhibit a pecular fastness to light and surpass thereby the analogous dyestuffs hitherto known, but containing no nitro group.

In order to further illustrate my invention the following examples are given, the parts being by weight and all temperatures in centigrade degrees, but it is to be understood, that my invention is not limited to the particular products nor reacting conditions mentioned therein.

Example 1

13.8 parts of p-nitraniline are diazotized in the ususal manner with 35 parts of hydrochloric acid (d=1.15) and 6.9 parts of sodium nitrite. The diazo solution is then allowed to flow at 0° into a solution of 28.9 parts of the sodium salt of 1-amino-2-ethoxynaphthalene-6-sulfonic acid mixed with a solution of sodium acetate. Then the mass is heated to 70° and rendered alkaline by the addition of sodium carbonate. The precipitated dyestuff is isolated by filtration and freed from the adhering mother lye by washing it with salt water. Then the paste is dissolved in 2000 liters of water and again diazotized by means of 7 parts of sodium nitrite and 35 parts of hydrochloric acid (d=1.15). When the diazotation is finished the mass is combined in the usual manner, while stirring, with a solution of 41 parts of the sodium salt of 2-benzoylamino-5-naphthol-7-sulfonic acid. When the formation of the nitro-azodyestuff is finished, the mass is heated, the dyestuff is precipitated by the addition of common salt, and isolated by filtration and washed. It corresponds to the formula:

$$O_2N-\bigcirc-N=N-\overset{O-C_2H_5}{\underset{SO_3H}{\bigcirc}}-N=N-\overset{SO_3H}{\underset{OH}{\bigcirc}}-NH-CO-\bigcirc$$

The paste is then dissolved in water and the solution is heated to boiling, while stirring, for some hours with 35 parts of crystallized copper sulfate in presence of acetic acid. Thereafter the product is isolated by filtration, washed with water, then made to a paste with sodium carbonate and water and again isolated therefrom.

The new dyestuff represents when dry a dark powder soluble in water with a greenish-grey, and in concentrated sulfuric acid with a green color, and dyes cotton greenish-grey shades of an excellent fastness to light.

Example 2

A diazo compound prepared in the same manner from 13.8 parts of m-nitraniline is allowed to run into a solution of 28.9 parts of the sodium salt of 1-amino-2-ethoxynaphthalene-6-sulfonic acid, mixed with a solution of sodium acetate. The combination to the amino-azo-dyestuff is instantly finished. The mass is filtered and the filtrate is washed with a little quantity of water. The paste is then mixed with ice and transformed into the diazo-azo-compound by means of 35 parts of hydrochloric acid and 6.9 parts of sodium nitrite. The reaction product is poured into a solution of 40 parts of the sodium salt of 2 - m - carboxyphenylamino - 5 - naphthol - 7 - sulfonic acid mixed with pyridine. The dyestuff precipitated by the addition of common salt is isolated by filtration and washed. It corresponds to the formula:

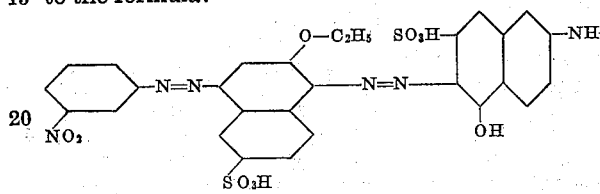

Thereafter the dyestuff paste is dissolved in water and transformed into the cupriferous compound by heating it for some hours to boiling under a reflux condenser, while stirring in an acetic acid medium with 35 parts of crystallized copper sulfate. The mass is filtered, the filtrate washed with cold water and thereby freed from the adhering excess of copper sulfate. Then the paste is mixed with a diluted soda lye and dried.

The dyestuff represents a black powder, which dissolves in water with a greenish-grey, in concentrated sulfuric acid with a green color and dyes cotton greenish-grey shades of an extraordinary fastness to light.

*Example 3*

29 parts of the sodium salt of 6-nitro-2-amino-naphthalene-8-sulfonic acid are diazotized with 35 parts of hydrochloric acid and 6.9 parts of the sodium salt of nitrous acid. This diazo compound is combined in the usual manner, while stirring, with an aqueous solution of 28 parts of the sodium salt of 1-amino-2-ethoxy-naphthalene-6-sulfonic acid. After some minutes the copulation is finished and the formed dyestuff is isolated by filtration.

Then the aminoazo-dyestuff is diazotized with 6.9 parts of sodium nitrite and 35 parts of hydrochloric acid (d=1.15). The excess of hydrochloric acid is neutralized by the addition of sodium acetate and the diazo compound is coupled with a solution of 36 parts of the sodium salt of 2-benzoylamino-5-naphthol-7-sulfonic acid. When the copulation is finished, the dyestuff is precipitated by the addition of common salt. The mass is filtered and the filtrate is washed, dissolved in water and acidified by means of acetic acid. The dyestuff corresponds to the formula:

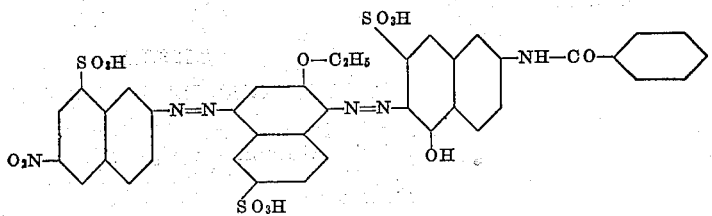

After the addition of a solution of 35 parts of crystallized copper sulfate the reaction product is boiled for some hours, while stirring under a reflux condenser. Then the dyestuff is isolated by filtration, washed, made to a paste with sodium carbonate and dried. The dark powder thus obtained dissolves in water with a greenish-grey, in concentrated sulfuric acid with a green color and dyes cotton greenish-grey shades of an excellent fastness to light.

*Example 4*

16.8 parts of 5-nitro-2-amino-anisole are mixed with 36 parts of hydrochloric acid (d=1.15), until the whole base is transformed into the chlorohydrate, and the paste is diazotized with 6.9 parts of sodium nitrite. The diazo-solution is coupled as described in Example 1 with the sodium salt of 1-amino-2-ethoxy-naphthalene-6-sulfonic acid, and the intermediate compound is isolated. The dyestuff is further diazotized with 35 parts of concentrated hydrochloric acid and 7 parts of sodium nitrite and coupled with a solution of the sodium salt of 2-(m-carboxyphenylamino)-5-naphthol-7-sulfonic acid containing pyridine. The dyestuff, corresponding to the formula:

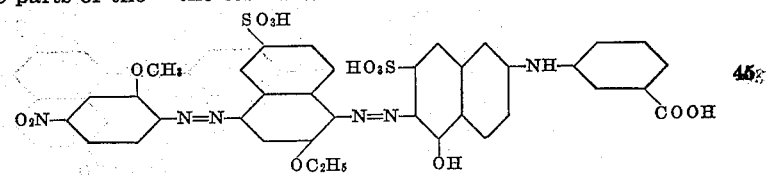

is isolated in the usual manner and mixed with water. After the addition of acetic acid and a solution of 35 parts of crystallized copper sulfate in a little quantity of water, the mixture is boiled for some hours while stirring under a reflux condenser. Then the dyestuff is isolated by filtration, washed and dried. The black powder dissolves in water to a blue, in concentrated sulfuric acid to a greyish-blue solution and dyes cotton grey shades of an excellent fastness to light.

I claim:

The copper compound of the dyestuff corresponding to the formula:

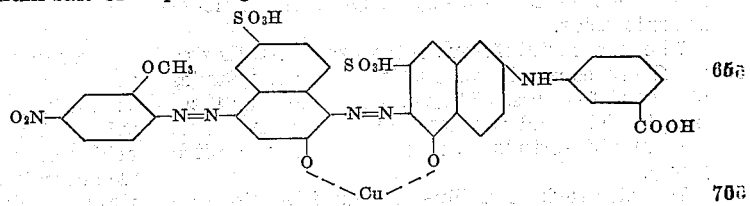

which compound represents a black powder soluble in water to a blue, in concentrated sulfuric acid to a greyish blue solution, dyeing cotton grey shades of an excellent fastness to light.

HANS SCHINDHELM.